United States Patent
Kobayashi et al.

(10) Patent No.: US 9,140,350 B2
(45) Date of Patent: Sep. 22, 2015

(54) WAVE GEAR DEVICE

(71) Applicant: HARMONIC DRIVE SYSTEMS INC., Shingawa-ku (JP)

(72) Inventors: Masaru Kobayashi, Azumino (JP); Yuki Honda, Azumino (JP)

(73) Assignee: HARMONIC DRIVE SYSTEMS INC., Shinagawa-Ku, Tokyo (JP)

( * ) Notice: Subject to any disclaimer, the term of this patent is extended or adjusted under 35 U.S.C. 154(b) by 0 days.

(21) Appl. No.: 14/002,480

(22) PCT Filed: Jan. 9, 2013

(86) PCT No.: PCT/JP2013/000032
§ 371 (c)(1),
(2) Date: Aug. 30, 2013

(87) PCT Pub. No.: WO2014/108932
PCT Pub. Date: Jul. 17, 2014

(65) Prior Publication Data
US 2014/0190298 A1     Jul. 10, 2014

(51) Int. Cl.
*F16H 57/04* (2010.01)
*F16H 49/00* (2006.01)

(52) U.S. Cl.
CPC .............. *F16H 49/001* (2013.01); *F16H 57/04* (2013.01); *Y10T 74/19642* (2015.01)

(58) Field of Classification Search
CPC ............................... F16H 49/001; F16H 57/04
USPC ............................................ 74/640, 604, 411
See application file for complete search history.

(56) References Cited

U.S. PATENT DOCUMENTS

| | | | |
|---|---|---|---|
| 5,222,409 A * | 6/1993 | Dalakian .................... | 74/479.01 |
| 5,775,178 A * | 7/1998 | Asawa et al. .................. | 74/640 |
| 5,816,117 A * | 10/1998 | Berry et al. ..................... | 74/640 |
| 5,906,142 A * | 5/1999 | Shirasawa ....................... | 74/640 |
| 5,984,048 A * | 11/1999 | Kiyosawa et al. ........... | 184/6.12 |
| 6,026,711 A * | 2/2000 | Tortora et al. .................. | 74/640 |
| 6,250,179 B1 * | 6/2001 | Shirasawa ....................... | 74/640 |

(Continued)

FOREIGN PATENT DOCUMENTS

| | | |
|---|---|---|
| JP | 57-102746 U | 6/1982 |
| JP | 60-057058 A | 4/1985 |

(Continued)

OTHER PUBLICATIONS

International Search Report (PCT/ISA/210) mailed on Mar. 12, 2013, by the Japanese Patent Office as the International Searching Authority for International Application No. PCT/JP2013/000032.

*Primary Examiner* — Ha D Ho
*Assistant Examiner* — Jude Agendia
(74) *Attorney, Agent, or Firm* — Buchanan Ingersoll & Rooney PC (57) ABSTRACT

The interior space of a cup-shaped flexible externally toothed gear of a cup-type wave gear device is divided into a front interior space and a rear interior space by a partition mechanism. A lubricant is filled in the front interior space at the side of a wave generator, to which lubrication is required. The volume of the front interior space is set so that a necessary amount of lubricant is filled. Since the lubricant is not necessary to fill in the entire interior space of the flexible externally toothed gear, the amount of lubricant to be filled can be reduced.

4 Claims, 6 Drawing Sheets

(56) References Cited

U.S. PATENT DOCUMENTS

| | | | |
|---|---|---|---|
| 6,269,711 B1 * | 8/2001 | Tejima | 74/640 |
| 6,564,677 B1 * | 5/2003 | Kiyosawa et al. | 74/640 |
| 6,817,267 B2 * | 11/2004 | Kobayashi et al. | 74/640 |
| 6,968,755 B2 * | 11/2005 | Kobayashi et al. | 74/640 |
| 7,752,943 B2 * | 7/2010 | Maruyama et al. | 74/640 |
| 7,882,766 B2 * | 2/2011 | Kiyosawa | 74/640 |
| 8,011,273 B2 * | 9/2011 | Kobayashi | 74/640 |
| 8,281,688 B2 * | 10/2012 | Kobayashi | 74/640 |
| 8,516,924 B2 * | 8/2013 | Pen et al. | 74/640 |
| 2002/0144570 A1 * | 10/2002 | Goold | 74/640 |
| 2007/0039414 A1 * | 2/2007 | Takemura | 74/640 |
| 2008/0098839 A1 * | 5/2008 | Maruyama et al. | 74/412 R |

FOREIGN PATENT DOCUMENTS

| | | |
|---|---|---|
| JP | 09-250610 A | 9/1997 |
| JP | 09-250611 A | 9/1997 |
| JP | 2011-064304 A | 3/2011 |

* cited by examiner

FIG. 6

WAVE GEAR DEVICE

TECHNICAL FIELD

The present invention relates to a wave gear device comprising a cup-shaped or silk-hat-shaped flexible externally toothed gear, and in particular, to a wave gear device in which the volume of lubricant packed in the interior of the flexible externally toothed gear is significantly reduced.

BACKGROUND ART

Known wave gear devices include cup-type wave gear devices provided with a cup-shaped flexible externally toothed gear, and silk hat-type wave gear devices provided with a silk-hat-shaped flexible externally toothed gear. In a cup-shaped flexible externally toothed gear, external teeth are formed on the outer peripheral surface part at the portion, on the side of a front opening end, of a cylindrical barrel part which is capable of deflecting to a non-circular shape; a diaphragm extending radially inwards is formed on a rear opening end; and a disc-shaped or ring-shaped boss is formed on the inner peripheral edge of the diaphragm. The diaphragm and the boss correspond to the bottom portion of the cup shape. The flexible externally toothed gear is fastened, through the boss, to a member such as a load-side member. In a silk-hat-shaped flexible externally toothed gear, external teeth are formed on the outer peripheral surface portion, on the front opening end, of a cylindrical barrel part; a diaphragm extending radially outwards is formed on the rear opening end; and a ring-shaped boss is formed on the outer peripheral edge of the diaphragm. The diaphragm and the boss correspond to the flange portion of the silk hat shape.

In a cup-type wave gear device or a silk hat-type wave gear device, contact parts to be lubricated are lubricated by a lubricant packed into the interior space in the flexible externally toothed gear. Patent Document 1 proposes a method for disposing an oil tank inside the flexible externally toothed gear. Small holes are formed on, e.g., on the outer peripheral surface of the oil tank. When the oil tank rotates with the flexible externally toothed gear, oil stored in the tank is discharged from the holes into the interior space in the flexible externally toothed gear. The lubricant discharged into the interior space lubricates various sections.

PRIOR ART DOCUMENTS

Patent Documents

[Patent Document 1] JP-A 2011-064304
[Patent Document 2] JP-A 09-250611

SUMMARY OF THE INVENTION

A large interior space is formed on the inside of a cup-shaped or silk-hat-shaped flexible externally toothed gear. In other words, the inside of the cylindrical barrel part of the flexible externally toothed gear remains as a large interior space, other than portions at which the wave generator is mounted. It is necessary to pack a lubricant (an oil or a grease) so as to fill the large interior space in order to enable lubrication of each contact part of the wave gear device irrespective of operation orientation. Therefore, the amount of lubricant packed is large, and there is an increased risk of the lubricant leaking to the exterior.

If the oil tank is disposed in the interior space in the flexible externally toothed gear, a smaller packing amount of lubricant is required compared to an instance in which the lubricant is packed in the interior space. However, the lubricant packed in the oil tank is discharged into the interior space in the flexible externally toothed gear, and fed through the interior space to each portion to be lubricated. If the oil tank is smaller than the interior space, the lubricant discharged from the oil tank scatters in the interior space, and the amount of the lubricant fed to portions to be lubricated may therefore not be sufficient.

Therefore, in an instance in which an oil tank is used, it is preferable that an oil tank having a large size corresponding to the interior space be used. It is thereby possible to reliably feed the lubricant discharged from the oil tank to the portions to be lubricated; however, the amount of lubricant packed is larger. In addition, if an oil tank filled with a large amount of lubricant is connected to the flexible externally toothed gear, there is also a risk of the rotation load of the flexible externally toothed gear increasing, and the properties of the wave gear device decreasing.

An object of the present invention is to propose a wave gear device in which the amount of lubricant packed in an interior space in a cup-shaped or silk-hat-shaped flexible externally toothed gear can be minimized and in which the lubricant can be reliably fed to portions to be lubricated irrespective of operation orientation.

Means to Solve the Problems

In order to solve the abovementioned problem, the wave gear device of the present invention is characterized in comprising:

a rigid internally toothed gear;

a flexible externally toothed gear having a cylindrical barrel part capable of deflecting to a non-circular shape, a diaphragm extending radially inwards or outwards from a rear opening end of the cylindrical barrel part, and a disc-shaped or ring-shaped boss formed on an inner peripheral edge or an outer peripheral edge of the diaphragm;

a wave generator, mounted on an inside of an external teeth formation portion on a side towards a front opening end of the cylindrical barrel part, the wave generator for deflecting the cylindrical barrel part to a non-circular shape so that the flexible externally toothed gear is partially engaged with the rigid internally toothed gear, and for moving the position of engagement between the two gears in a circumferential direction; and a partition mechanism, which rotates integrally with the flexible externally toothed gear, and partitions an interior space in the cylindrical barrel part into a front interior space on a side towards the wave generator and a rear interior space on a side towards the diaphragm.

The interior space in the flexible externally toothed gear, i.e., the interior space in the cylindrical barrel part, is partitioned by the partition mechanism into the front interior space and the rear interior space. The lubricant is packed into the rear interior space, on the side towards the wave generator, where lubricant is necessary. The volume of the rear interior space is set so that the required volume of the lubricant can be packed. The amount of lubricant packed can be made less than when the lubricant is packed so as to fill the interior space in the flexible externally toothed gear.

The lubricant packed in the rear interior space is in a state of being in direct contact with the portion to be lubricated (contact portions of the wave generator, contact portion between the wave generator and the inner peripheral surface of the flexible externally toothed gear, etc.). Therefore, the lubricant can be reliably fed to each of the portions to be lubricated.

The partition mechanism rotates with the flexible externally toothed gear. Even when the partition mechanism is provided, there is substantively no increase in resistance due to rotation with regards to the flexible externally toothed gear. Accordingly, the efficiency of the wave gear device can be prevented from being reduced by the provision of the partition mechanism.

In the wave gear device of the present invention, the partition mechanism is preferably provided with an elastic body capable of elastically deforming with the cylindrical barrel part. In such an instance, the elastic body maintains a state of contact with the inner peripheral surface of the cylindrical barrel part along the entire circumference at the portion between the wave generator and the diaphragm.

The elastic body reliably provides a seal between the front interior space and the rear interior space. Accordingly, the lubricant packed into the rear interior space will not leak to the side of the front interior space.

Each part of the cylindrical barrel part of the flexible externally toothed gear is a vibrating portion, which is repeatedly deflected in the radial direction. Occurrence of higher-order vibration in the cylindrical barrel part is suppressed by the elastic body in constant contact with the inner peripheral surface of the cylindrical barrel part. The elastic body can also change the natural frequency of the flexible externally toothed gear and inhibit resonance from occurring.

The partition mechanism may also be configured so as to comprise the elastic body and a support member for supporting the elastic body. In such an instance, a circular groove is formed, on the outer peripheral surface of the support member, along the outer peripheral surface, and the elastic body is mounted in the circular groove.

The end surface of the support member facing the wave generator is preferably shaped so as to impart a shear force gradient to the lubricant packed in the front interior space. For example, the end surface may be a flat surface perpendicular to the center axis of the wave generator, or a concave conical surface centered on a position on the center axis.

The support member rotates in synchronization with the flexible externally toothed gear, and is therefore not subjected to a large force. Accordingly, plastic, non-ferrous metal including aluminum and the like, or steel can be used as a material of the support member.

The flexible externally toothed gear may be fastened to the output flange via the boss. In this case, the cup-shaped flexible externally toothed gear, the holding member, and the output flange are coaxially fastened in a state in which the boss is sandwiched between the holding member and the output flange. The support member can be attached to the holding member. Alternatively, the support member can be integrally formed with the holding member (in other words, the support member and the holding member may be formed from a single member).

In an instance of a silk-hat-shaped flexible externally toothed gear, the boss is coaxially fastened to the outer peripheral portion of the disc-shaped output flange. Therefore, the support member can be coaxially fastened to the center portion of the output flange by screwing or bolting.

BEST MODE FOR CARRYING OUT THE INVENTION

Embodiments of a wave gear device to which the present invention has been applied will now be described with reference to the accompanying drawings.

First Embodiment

Figure 1:
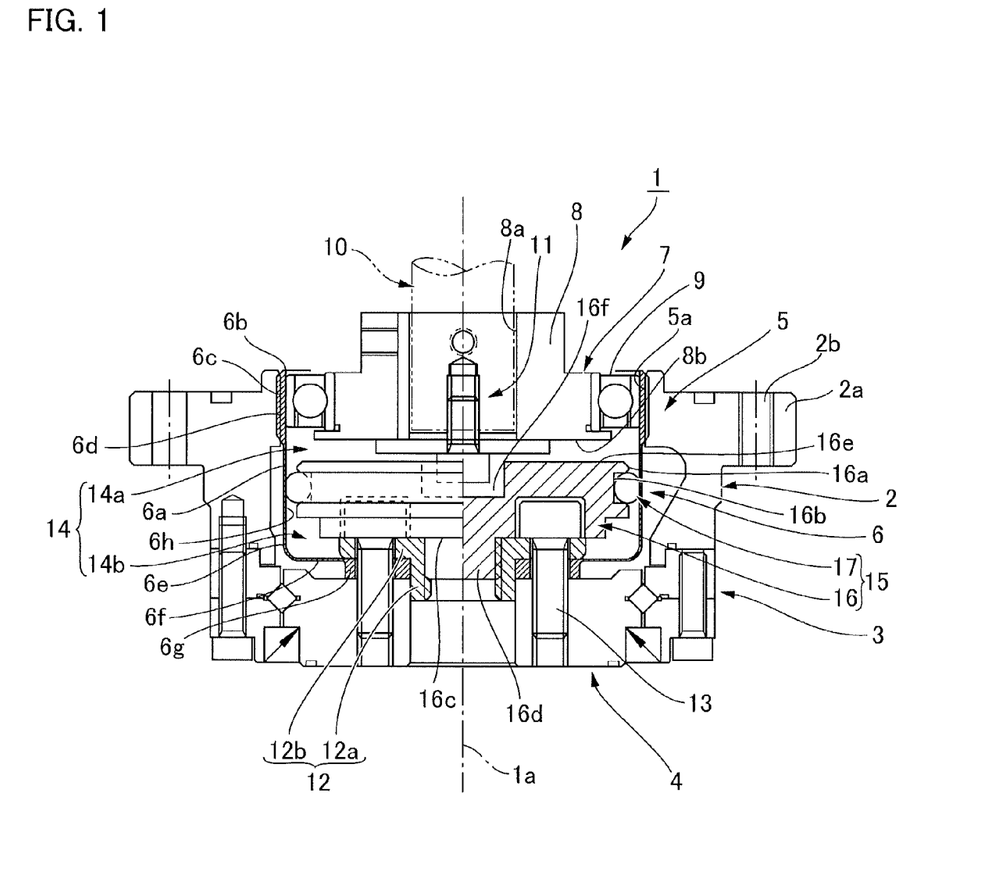
FIG. 1 is a vertical cross-section showing a cup-shaped wave gear device according to a first embodiment of the present invention.

FIG. 1 is a vertical cross-section view of a cup-type wave gear device to which the present invention has been applied. The cup-type wave gear device 1 has a cylindrical device housing 2. A disc-shaped output flange 4 is attached, in a rotatable state, to the rear side (towards the bottom in the drawing) of the device housing 2 with a cross roller bearing 3 interposed therebetween.

An attachment flange 2a is formed on the outer periphery of the device housing 2, and bolt holes 2b are formed, at a predetermined pitch, along the circumferential direction. Internal teeth 5a are formed on the circular inner peripheral surface of the front end part of the device housing 2. The front end part functions as a rigid internally toothed gear 5. In other words, the rigid internally toothed gear 5 is integrally formed in the device housing 2. A cup-shaped flexible externally toothed gear 6 is coaxially disposed in the device housing 2. A wave generator 7 is coaxially mounted on the inside of the flexible externally toothed gear 6. The wave generator 7 causes the flexible externally toothed gear 6 to deflect to a non-circular, e.g., ellipsoidal shape, and partially engage with the rigid internally toothed gear 5.

The wave generator 7 has a rigid plug 8 provided with a shaft hole 8a for connecting an input shaft, and a wave bearing 9 mounted to the ellipsoidal outer peripheral surface of the plug 8. The wave bearing 9 is provided with a bearing ring capable of deflecting in the radial direction, and in a state in which the wave bearing 9 is mounted on the plug 8, the outer peripheral surface of the outer ring thereof is deflected to an ellipsoidal shape. An input shaft 10 inserted into the shaft hole 8a of the plug 8 is coaxially fastened to the plug 8 by, e.g., a fastening bolt 11. The output rotation from a motor or a similar device is inputted into the wave generator 7 through the input shaft 10.

The flexible externally toothed gear 6 is provided with a cylindrical barrel part 6a capable of deflecting to a non-circular shape. External teeth 6c are formed on the outer peripheral surface portion, on the side of the front opening end 6b, of the cylindrical barrel part 6a. The portion on the cylindrical barrel part 6a on which the external teeth 6c are formed is referred to as an external teeth formation portion 6d. A diaphragm 6f extends radially inwards from a rear opening end 6e of the cylindrical barrel part 6a. A ring-shaped boss 6g is formed in continuation from the inner peripheral edge of the diaphragm 6f.

The wave generator 7 is mounted on the inside of the external teeth formation portion 6d of the cylindrical barrel part 6a of the flexible externally toothed gear 6. The external teeth formation portion 6d is deflected by the wave generator 7 to an ellipsoidal shape, and external teeth 6c positioned at both ends of the major axis of the ellipse engage with the internal teeth 5a of the rigid internally toothed gear 5.

The boss 6g of the flexible externally toothed gear 6 is coaxially fastened, by a plurality of fastening bolts 13, to the output flange 4 in a state of being sandwiched between a ring-shaped holding member 12 and the output flange 4. The holding member 12 has formed thereon: a cylindrical portion 12a; and a disc-shaped portion 12b spreading radially outwards from the front opening end of the cylindrical portion 12a. The cylindrical portion 12a is fitted, from the front side of the boss 6g, into a hollow hole in the boss 6g and a hollow hole in the output flange 4, and coaxially position the boss 6g and the output flange 4. The disc-shaped portion 12b, the output flange 4, and the boss 6g are fastened by the fastening bolts 13 in a state in which the boss 6g is sandwiched between the disc-shaped portion 12b and the output flange 4.

A partition mechanism 15 is incorporated to the inside of the cup-shaped flexible externally toothed gear 6. The interior space 14 in the cylindrical barrel part 6a of the flexible externally toothed gear 6 is partitioned by the partition mechanism 15 into a front interior space 14a on the side towards the wave generator 7, and a rear interior space 14b on the side towards the diaphragm 6f. The partition mechanism 15 is provided with a support member 16 and an elastic body 17. The support member 16 has an overall disc shape, and is coaxially screwed to the holding member 12. The elastic body 17 is an elastic ring having a circular cross-section, and is mounted to a circular groove 16b, having a rectangular cross-section, formed on the circular outer peripheral surface 16a of the support member 16.

More specifically, a small-diameter shaft part 16d, which protrudes rearwards in a coaxial state, is formed on the rear end surface 16c of the support member 16. The small-diameter shaft part 16d is fitted into the hollow section of the cylindrical portion 12a of the holding member 12. The support member 16 is thereby positioned so as to be coaxial with respect to the holding member 12. The front surface 16e of the support member 16 is the end surface on the side facing the wave generator 7, and is a flat, circular end surface perpendicular to the device center axis 1a. A circular recess 16f is formed, at the center of the front surface 16e, so as to not interfere with the head of the fastening bolt 11.

The elastic body 17 is in contact, at a section between the diaphragm 6f and the wave generator 7, with the inner peripheral surface 6h of the cylindrical barrel part 6a of the flexible externally toothed gear 6. In other words, [the elastic body 17] is in contact, at a section between the external teeth formation portion 6d and the rear opening end 6e, with the inner peripheral surface 6h of the cylindrical barrel part 6a. The elastic body 17 is in contact along the entire circumference of the inner peripheral surface 6h in a state in which the circular cross-section of the elastic body 17 is crushed inwards by a predetermined amount in the diameter direction. Therefore, even in a state in which the cylindrical barrel part 6a is deflected to an ellipsoidal shape by the wave generator 7, each part of the elastic body 17 in the circumferential direction elastically deforms with the deflection of the cylindrical barrel part 6a, and the state of contact with the inner peripheral surface 6h is maintained.

The support member 16 rotates integrally with the flexible externally toothed gear 6; therefore, a large stress is prevented from acting during actuation. Accordingly, the material constituting the support member 16 may be either steal, plastic or non-ferrous metal such as aluminum. The elastic body 17 can be formed from a rubber material, and an elastic ring having a circular cross-section, a lip-shaped elastic ring, or a similar body can be used. The requirement for the elastic body 17 is to be capable of deforming with the cylindrical barrel part 6a in the radial direction and forming a state of being in contact with the inner peripheral surface 6h along the entire circumference, and the elastic body 17 may therefore also be a ring-shaped member capable of deflecting overall in the radial direction.

In a cup-type wave gear device 1 having a configuration of such description, rotation is inputted from a motor (not shown) or a similar device into the wave generator 7 through the input shaft 10. When the wave generator 7 rotates, the position of engagement between the rigid internally toothed gear 5 and the flexible externally toothed gear 6 moves in the circumferential direction. The number of external teeth 6c is smaller than the number of internal teeth 5a by $2n$ (where n is a positive integer), normally by two. Accordingly, a relative rotation is generated between the two gears 5, 6. If the rigid internally toothed gear 5 is fixed so that rotation does not occur, the flexible externally toothed gear 6 rotates at a rotation speed that is significantly reduced in relation to the input rotation speed inputted into the wave generator 7. This reduced-speed rotation is outputted from the output flange 4.

The interior space 14 in the flexible externally toothed gear 6 is partitioned by a partitioning mechanism 15 into the front interior space 14a and the rear interior space 14b. A lubricant (an oil or a grease) is packed in the front interior space 14a. This lubricant provides lubrication to parts such as the contact parts of the wave generator 7 and the contact part between the wave generator 7 and the flexible externally toothed gear 6.

Each part of the cylindrical barrel part 6a of the flexible externally toothed gear 6 is repeatedly deflected radially inwards and outwards with the rotation of the wave generator 7. The elastic body 17 of the partitioning mechanism 15 is in contact with the inner peripheral surface 6h of the cylindrical barrel part 6a in a state in which each part of the elastic body 17 along the circumferential direction is crushed inwards. Therefore, when each part of the cylindrical barrel part 6a along the circumferential direction is deflected radially inwards and outwards, each part of the elastic body 17 along the circumferential direction correspondingly deforms elastically in the diameter direction. Accordingly, the elastic body 17 is maintained in a state of being in contact with the inner peripheral surface 6h of the cylindrical barrel part 6a along the entire circumference. In other words, a state of sealing is retained between the front interior space 14a and the rear interior space 14b, and the lubricant is prevented from leaking into the rear interior space 14b.

The front surface 16e of the support member 16 is a flat surface, and faces, at a predetermined spacing and from the rear, the flat rear end surface 8b of the plug 8 of the wave generator 7. The members 16, 8 rotate at different speeds, and the lubricant packed therebetween lubricate each of the contact parts on the outer peripheral side of the front interior space 14a. Specifically, when lubrication is performed using an oil, the front surface 16e functions as a lift cone, and when lubrication is performed using a grease, the front surface 16e functions as a grease retention wall positioned in the vicinity of the contact parts to be lubricated.

(First Modification of Partition Mechanism)

Figure 2:
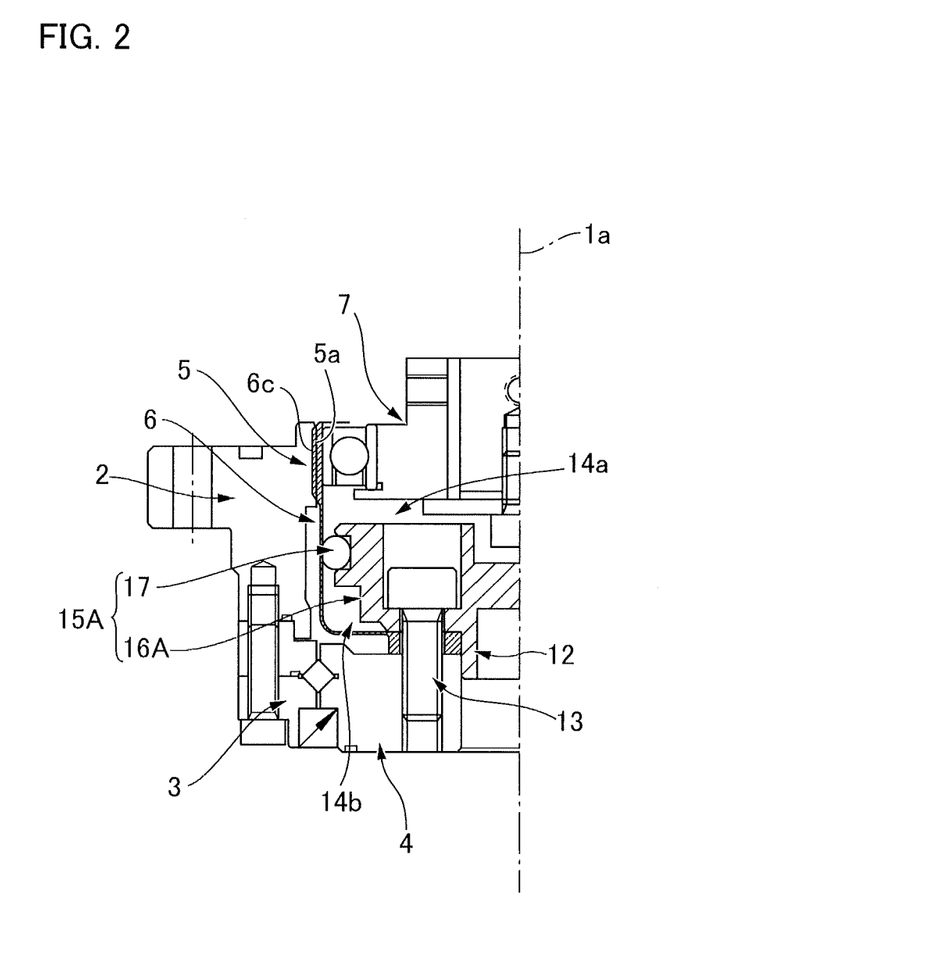
FIG. 2 is a vertical cross-section showing an example of modification of FIG. 1.

FIG. 2 is a vertical cross-section view showing a first modification of the partition mechanism 15 of the above cup-type wave gear device 1. In the partition mechanism 15A shown in FIG. 2, the support member 16A is integrally formed on the holding member 12. In other words, the holding member 12 and the support member 16A are formed from a single component, and a portion that functions as the support member 16A (i.e., a support portion) is formed on the holding member 12. In this instance, there is no need for a fastener such as a screw for fixing the support member 16A to the holding member 12.

(Second Modification of Partition Mechanism)

Figure 3:
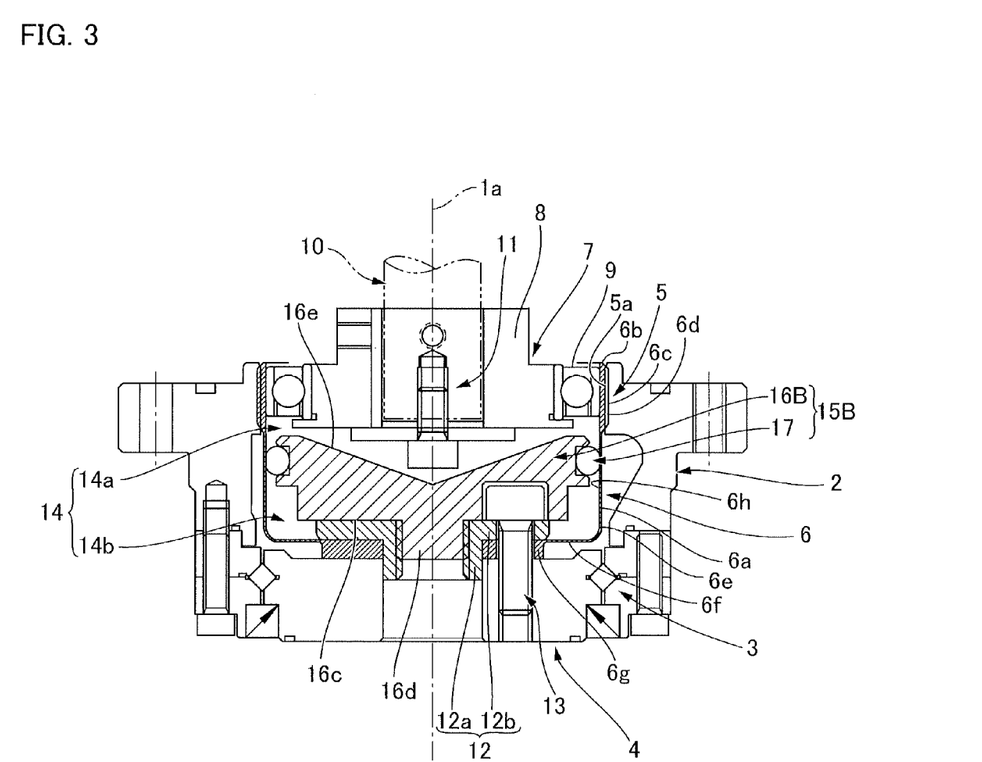
FIG. 3 is a vertical cross-section showing an example of modification of FIG. 1.

FIG. 3 is a vertical cross-section view showing a second modification of the partition mechanism 15 of the above cup-type wave gear device. In the partition mechanism 15B shown in FIG. 3, the front surface 16e of the support member 16B thereof is defined by a concave conical surface centered on the device center axis 1a. The configuration of the partition mechanism 15B is otherwise identical to that of the aforementioned partition mechanism 15.

(Third Modification of Partition Mechanism)

Figure 4:
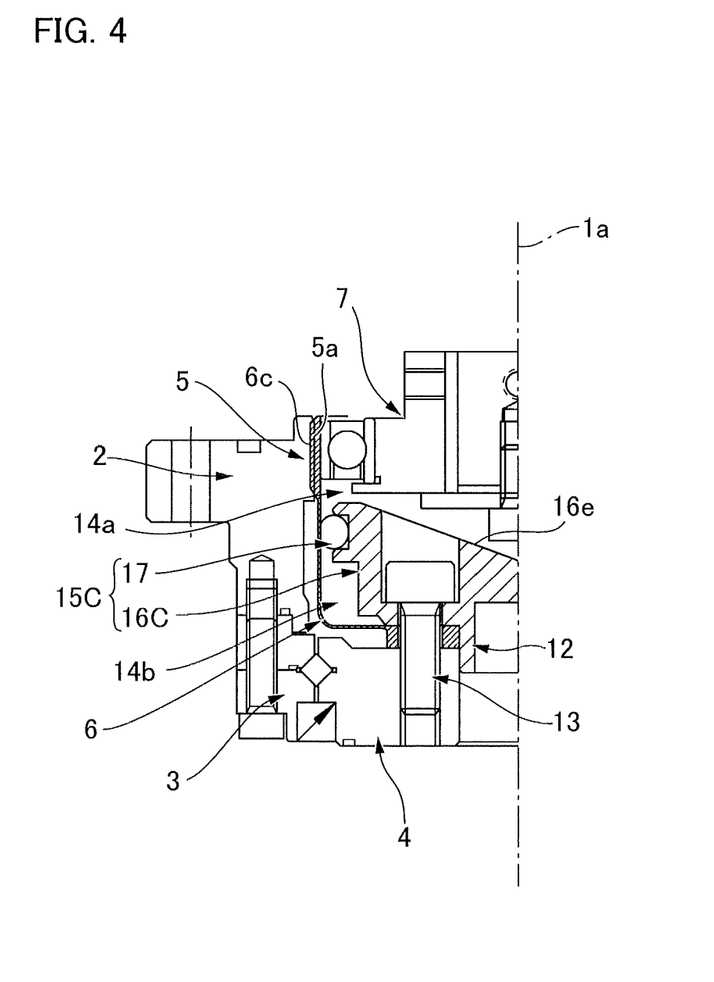
FIG. 4 is a vertical cross-section showing an example of modification of FIG. 1.

FIG. 4 is a vertical cross-section view showing a third modification of the partition mechanism 15 of the above cup-type wave gear device. In the partition mechanism 15C shown in FIG. 4, the support member 16C thereof is integrally formed on the holding member 12. The front surface 16e of the support member 16C is defined by a concave conical surface centered on the device center axis 1a. The configuration of the partition mechanism 15C is otherwise identical to that of the aforementioned partition mechanism 15B.

Second Embodiment

Figure 5:
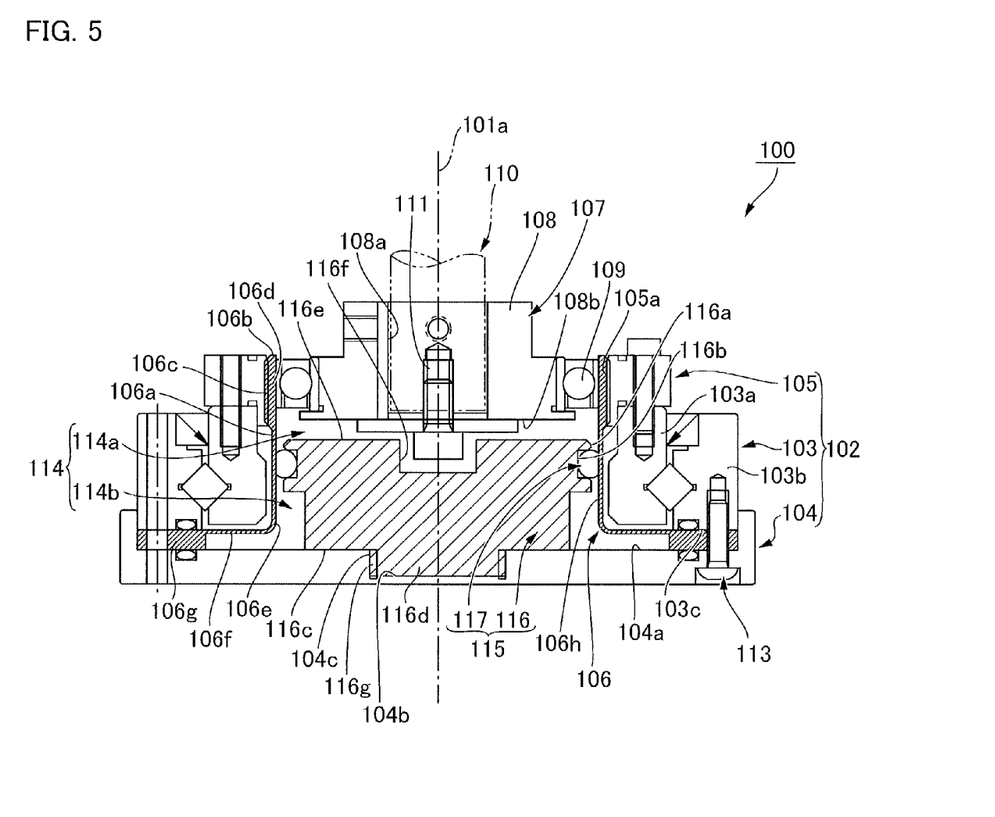
FIG. 5 is a vertical cross-section showing a silk-hat-shaped wave gear device according to a second embodiment of the present invention.

FIG. 5 is a vertical cross-section view showing a silk hat-type wave gear device to which the present invention is applied. The silk hat-type wave gear device 100 is provided with a device housing 102 opening forward (upward in the drawing). The device housing 102 comprises a ring-shaped rigid internally toothed gear 105 having internal teeth 105a formed on the circular inner peripheral surface, and a cross roller bearing 103. The rigid internally toothed gear 105 is coaxially fastened to the front end surface of an inner ring 103a of the cross roller bearing 103. A disc-shaped output flange 104 is coaxially fastened to the rear end surface of an outer ring 103b of the cross roller bearing 103.

A silk-hat-shaped flexible externally toothed gear 106 is coaxially disposed on the interior of the device housing 102. A wave generator 107 is coaxially mounted on the inside of the flexible externally toothed gear 106. The wave generator 107 causes the flexible externally toothed gear 106 to deflect to, e.g., an ellipsoidal shape and partially engage with the rigid internally toothed gear 105.

The wave generator 107 is provided with a rigid plug 108 provided with a shaft hole 108a for connecting an input shaft, and a wave bearing 109 mounted to the ellipsoidal outer peripheral surface of the plug 108. The wave bearing 109 is provided with a bearing ring capable of deflecting in the radial direction, and in a state in which the wave bearing 109 is mounted on the plug 108, the outer peripheral surface of the outer ring thereof is deflected to an ellipsoidal shape. An input shaft 110 inserted into the shaft hole 108a of the plug 108 is coaxially fastened to the plug 108 by, e.g., a fastening bolt 111. The output rotation from a motor or a similar device is inputted into the wave generator 107 through the input shaft 110.

The flexible externally toothed gear 106 is provided with a cylindrical barrel part 106a capable of deflecting to a non-circular shape. External teeth 106c are formed on the outer peripheral surface portion, on the side of the front opening end 106b, of the cylindrical barrel part 106a. The portion on the cylindrical barrel part 106a on which the external teeth 106c are formed is referred to as an external teeth formation portion 106d. A diaphragm 106f extends radially inwards from a rear opening end 106e of the cylindrical barrel part 106a. A ring-shaped boss 106g is formed in continuation from the outer peripheral edge of the diaphragm 106f.

The wave generator 107 is mounted on the inside of the external teeth formation portion 106d of the cylindrical barrel part 106a of the flexible externally toothed gear 106. The external teeth formation portion 106d is deflected by the wave generator 107 to an ellipsoidal shape, and external teeth 106c positioned at both ends of the major axis of the ellipse engage with the internal teeth 105a of the rigid internally toothed gear 105.

The boss 106g of the flexible externally toothed gear 106 is sandwiched between the outer-periphery-side portion of the front end surface 104a of the output flange 104 and the rear end surface 103c of the outer ring 103b of the cross roller bearing 103. The three members are coaxially fastened in this state by a plurality of fastening bolts 113.

A partition mechanism 115 is incorporated to the inside of the silk-hat-shaped flexible externally toothed gear 106. The interior space 114 in the cylindrical barrel part 106a of the flexible externally toothed gear 106 is partitioned by the partition mechanism 115 into a front interior space 114a on the side towards the wave generator 107, and a rear interior space 114b on the side towards the diaphragm 106f. The partition mechanism 115 is provided with a support member 116 and an elastic body 117. The support member 116 has an overall disc shape, and is coaxially fastened to the output flange 104. The elastic body 117 is an elastic ring having a circular cross-section, and is mounted to a circular groove 116b, having a rectangular cross-section, formed on the circular outer peripheral surface 116a of the support member 116.

More specifically, a small-diameter shaft part 116d, which protrudes rearwards in a coaxial state, is formed, at the center, on the rear end surface 116c of the support member 116. An external thread 116g is carved into the outer peripheral surface of the small-diameter shaft part 116d. A recess 104b having a circular cross-section is formed at the center of the output flange 104, and an internal thread 104c to which the external thread 116g can be threadedly engaged is carved in the circular inner peripheral surface of the recess 104b. Threadedly engaging the support member 116 to the output flange 104 fastens the support member 116 to the output flange 104. The front surface 116e of the support member 116 is the end surface on the side facing the wave generator 107, and is a flat, circular end surface perpendicular to the device center axis 101a. A circular recess 116f is formed, at the center of the front surface 116e, so as to not interfere with the head of the fastening bolt 111.

The elastic body 117 is in contact, at a section between the diaphragm 106f and the wave generator 107, with an inner peripheral surface 106h of the cylindrical barrel part 106a of the flexible externally toothed gear 106. In other words, the elastic body 117 is in contact, at a section between the external teeth formation portion 106d and the rear opening end 106e, with the inner peripheral surface 106h of the cylindrical barrel part 106a. The elastic body 117 is in contact along the entire circumference of the inner peripheral surface 106h in a state in which the circular cross-section of the elastic body 117 is crushed inwards by a predetermined amount in the diameter direction. Therefore, even in a state in which the cylindrical barrel part 106a is deflected to an ellipsoidal shape by the wave generator 107, each part of the elastic body 117 in the circumferential direction elastically deforms with the deflection of the cylindrical barrel part 106a, and the state of contact with the inner peripheral surface 106h is maintained.

The support member 116 rotates integrally with the flexible externally toothed gear 106; therefore, a large stress is prevented from acting during actuation. Accordingly, the material constituting the support member 116 may be either a plastic, a non-ferrous metal such as aluminum or a steel. The elastic body 117 can be formed from a rubber material, and an elastic ring having a circular cross-section, a lip-shaped elastic ring, or a similar body can be used. The requirement for elastic body 117 is to be capable of deforming with the cylindrical barrel part 106a in the radial direction and forming a state of being in contact with the inner peripheral surface 106h along the entire circumference, and the elastic body 117 may therefore also be a ring-shaped member capable of deflecting overall in the radial direction.

In a silk-hat-type wave gear device 100 having a configuration of such description, rotation is inputted from a motor (not shown) or a similar device into the wave generator 107 through the input shaft 110. When the wave generator 107 rotates, the position of engagement between the rigid internally toothed gear 105 and the flexible externally toothed gear 106 moves in the circumferential direction. The number of external teeth 106c is smaller than the number of internal teeth 105a by 2n (where n is a positive integer), normally by two. Accordingly, a relative rotation is generated between the two gears 105, 106. If the rigid internally toothed gear 105 is fixed so that rotation does not occur, the flexible externally toothed gear 106 rotates at a rotation speed that is significantly reduced in relation to the input rotation speed inputted into the wave generator 107. This reduced-speed rotation is outputted from the output flange 104.

The interior space 114 in the flexible externally toothed gear 106 is partitioned by a partition mechanism 115 into the front interior space 114a and the rear interior space 114b. A lubricant (an oil or a grease) is packed in the front interior space 114a. This lubricant provides lubrication to parts such as the contact parts of the wave generator 107 and the contact part between the wave generator 107 and the flexible externally toothed gear 106.

Each part of the cylindrical barrel part 106a of the flexible externally toothed gear 106 is repeatedly deflected radially inwards and outwards with the rotation of the wave generator 107. The elastic body 117 of the partition mechanism 115 is in contact with the inner peripheral surface 16h of the cylindrical barrel part 16a in a state in which each part of the elastic body 117 along the circumferential direction is crushed inwards. Therefore, when each part of the cylindrical barrel part 106a along the circumferential direction is deflected radially inwards and outwards, each part of the elastic body 117 along the circumferential direction correspondingly deforms elastically in the diameter direction. Accordingly, the elastic body 117 is maintained in a state of being in contact with the inner peripheral surface 106h of the cylindrical barrel part 106a along the entire circumference. In other words, a state of sealing is retained between the front interior space 114a and the rear interior space 114b, and the lubricant is prevented from leaking into the rear interior space 114b.

The front surface 116e of the support member 116 is a flat surface, and faces, at a predetermined spacing and from the rear, the flat rear end surface 108b of the plug 108 of the wave generator 7. The members 116, 108 rotate at different speeds, and the lubricant packed therebetween lubricate each of the contact parts on the outer peripheral side of the front interior space 114a. Specifically, when lubrication is performed using an oil, the front surface 116e functions as a lift cone, and when lubrication is performed using a grease, the front surface 116e functions as a grease retention wall positioned in the vicinity of the contact parts to be lubricated.

(Modification of Partition Mechanism)

Figure 6:
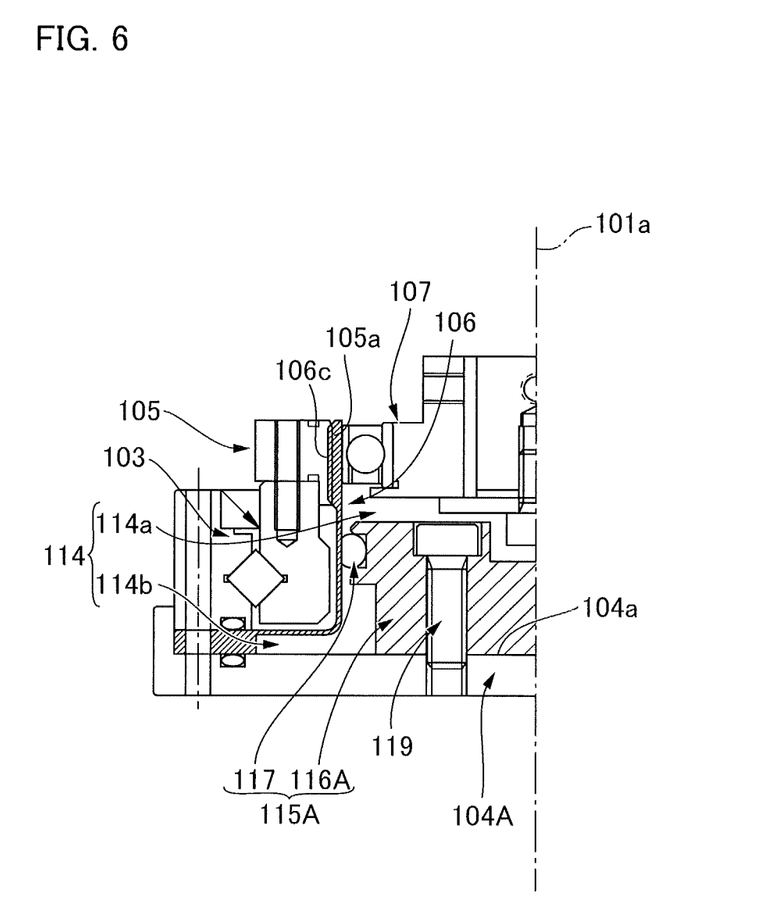
FIG. 6 is a vertical cross-section showing an example of modification of FIG. 5.

FIG. 6 is a vertical cross-section view showing a modification of the partition mechanism 115 of the above silk hat-type wave gear device 100. In the partition mechanism 115A shown in FIG. 6, the support member 116A thereof is coaxially fastened to the output flange 104A by a plurality of fastening bolts 119 arranged on a concentric circle. Therefore, the small-diameter shaft part, external thread, circular recess, or internal thread is not formed. Instead, a plurality of bolt holes are formed on the support member 116A and the output flange 104A so as to be positioned on a concentric circle. The configuration of the partition mechanism 115A is otherwise identical to that of the aforementioned partition mechanism 115.

The invention claimed is:

1. A wave gear device, comprising:
a rigid internally toothed gear;
a cup-shaped flexible externally toothed gear having a cylindrical barrel part capable of deflecting to a non-circular shape, a diaphragm extending radially inwards from a rear opening end of the cylindrical barrel part, and a disc-shaped or ring-shaped boss formed on an inner peripheral edge or an outer peripheral edge of the diaphragm, wherein the number of teeth on the internally toothed gear is different than the number of teeth on the externally toothed gear;
a wave generator mounted on an inside of an external teeth formation portion on a side towards a front opening end of the cylindrical barrel part, the wave generator deflecting the cylindrical barrel part to a non-circular shape so that the flexible externally toothed gear is partially engaged with the rigid internally toothed gear, the wave generator arranged so as to create relative rotation between the internally toothed gear and the externally toothed gear, and the wave generator moving positions of engagement between the two gears in a circumferential direction;
a partition mechanism, which rotates integrally with the flexible externally toothed gear, and partitions an interior space in the cylindrical barrel part between the wave generator and the diaphragm into a front interior space on a side towards the wave generator and a rear interior space on a side towards the diaphragm;
an output flange;
a holding member; and
fastening bolts for fastening the holding member, the boss and the output flange in a state in which the boss is sandwiched between the holding member and the output flange;
wherein:
the partition mechanism has a support member and an elastic body capable of elastically deforming with the cylindrical barrel part,
the support-member has a support portion for supporting the elastic body,
a circular groove is formed on an outer peripheral surface of the supporting portion and along the outer peripheral surface thereof,
the elastic body is mounted in the circular groove, and
the elastic body is located at a position between the wave generator and the diaphragm, and maintains a state of contact with an inner peripheral surface of the cylindrical barrel part along an entire circumference of the elastic body in a state in which a circular cross-section of the elastic body is crushed inwards by a predetermined amount in a diameter direction thereof, and wherein:

the partition mechanism maintains a state of sealing between the front interior space and the rear interior space for preventing a lubricant packed in the front interior space from leaking into the rear interior space.

2. The wave gear device according to claim 1, wherein the support portion has an end surface facing the wave generator, and the end surface is a flat surface perpendicular to a center axis of the wave generator, or a concave conical surface centered on a position on the center axis.

3. The wave gear device according to claim 2, wherein the support portion is made from steal, non-ferrous metal or plastic.

4. The wave gear device according to claim 1, wherein the support portion is made from steal, non-ferrous metal or plastic.

* * * * *